W. D. QUIMBY.
WATERING TROUGH.
APPLICATION FILED DEC. 8, 1910.
993,273.
Patented May 23, 1911.
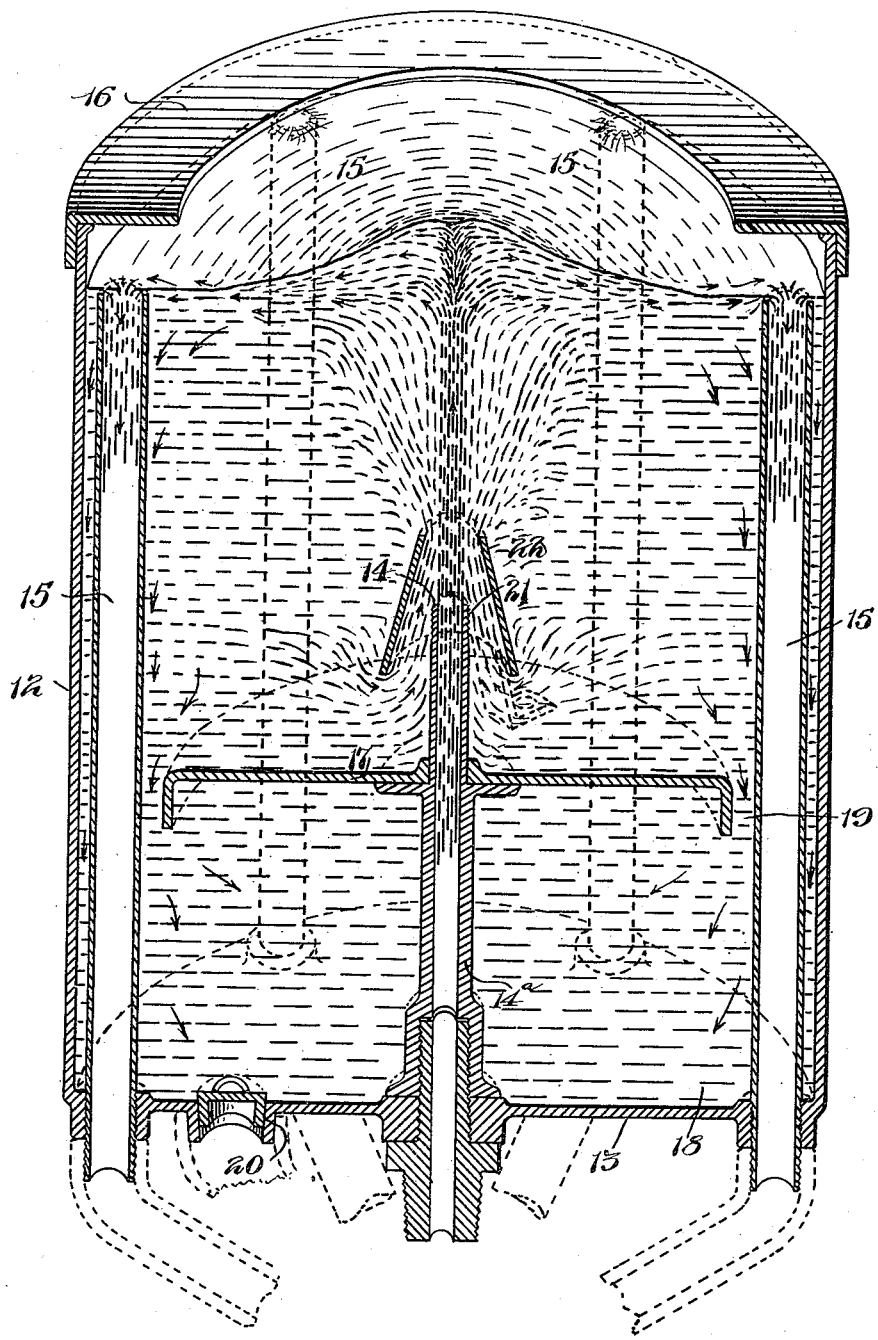

UNITED STATES PATENT OFFICE.

WILLIAM D. QUIMBY, OF SOMERVILLE, MASSACHUSETTS.

WATERING-TROUGH.

993,273.

Specification of Letters Patent.  Patented May 23, 1911.

Application filed December 8, 1910. Serial No. 596,222.

*To all whom it may concern:*

Be it known that I, WILLIAM D. QUIMBY, of Somerville, in the county of Middlesex and State of Massachusetts, have invented certain new and useful Improvements in Watering-Troughs, of which the following is a specification.

This invention has for its chief object to provide a sanitary watering trough of such construction that discharges from the nose of a horse afflicted with glanders or other objectionable or contagious diseases, accompanied by discharge from nose and mouth, will be quickly and continuously removed from the available area of drinking surface on a body of water in the trough, so that another horse drinking from the same trough cannot be infected by such discharges.

Other objects of the invention are (1) to provide means for the segregation of the contagious discharges which settle in the body of water in the trough, so that they cannot again enter the drinking area, (2) to provide means for cleaning out the bottom of the trough to remove all matter accumulating therein, and (3) to enable a stream of water admitted to the trough for the purpose of maintaining a body of water therein, to set in motion some of the accumulated water in the trough, and thus augment a stream directed by the supply pipe upwardly into the inner portion of the available area of drinking surface, the water at the inner portion of said surface being thus caused to rise above the general level of the surface and move forcibly outward with any infectious discharges that may be deposited thereon.

The accompanying drawing represents a perspective sectional view of a drinking trough embodying my invention.

In the drawings, 12 represents the curb and 13 the bottom of a drinking trough or reservoir which may be of any suitable shape, the trough here represented being circular.

14 represents a water inlet adapted to continuously deliver water to the trough, said inlet as here shown being the delivering end or nozzle of a pipe 14ª which passes through the bottom of the trough and terminates at any suitable distance below the upper end of the trough, the said pipe being suitably connected with a source of water supply.

The trough is provided with a plurality of outlets 15 which are preferably stand pipes extending through the bottom of the trough, their upper ends being higher than the inlet 14 and all of the stand pipes being of the same height. Water admitted to the trough through the inlet 14 accumulates and forms a body, the height of which is determined by the height of the stand pipes or outlets 15, the water overflowing through said outlets when it reaches the level of their upper ends. The outlets 15 are located in close proximity to the curb 12 and are separated from the inlet so that the body of water has a suitable surface area between the inlet and the outlets. The inlet which, as above stated, is preferably below the upper ends of the outlets, is below the surface of the body of water when the trough is full, and is arranged to discharge a jet of water upwardly into the inner portion of the surface of the body of water, the pressure of the water supply being such as to cause the water to rise on the surface of the body immediately above the inlet and flow outwardly from the inner portion of said surface toward the outer portion occupied by the outlets. There is therefore, a constant outward movement of water at the surface of the body, said movement being sufficiently forcible to cause discharges from the nose of a horse drinking at the trough to pass rapidly from the inner portion to the outer portion of the surface of the body. When the trough is full, any foreign matter carried outwardly by the water and floating on the surface thereof, will pass out through the outlets. When the water level has been temporarily lowered, the floating matter carried outwardly will accumulate at the outer portion of the surface of the body excepting matter the specific gravity is such that it sinks.

To prevent any floating matter carried to the outward portion of the surface of the body of water from being swallowed by another horse, I provide the curb 12 with an inwardly projecting guard 16, which overhangs the outlets 15, and the outer portion of the surface of the water, said guard being preferably a flange formed on or attached to the upper end of the curb. The width of the guard is such that it effectually shields any floating matter carried outwardly on the surface of the water from the nose of a horse drinking at the trough, the guard so restricting the available drinking area that floating matter previously carried outwardly on the surface of the water is outside said area. The specific gravity of the pustular matter discharged by a horse afflicted with glanders, is such that said matter sinks somewhat slowly to the bottom of the trough, the matter being first carried outwardly by the outward movement of the surface water, and passing downwardly along the inner surface of the curb 12.

To provide for the segregation of relatively heavy matter sinking to the bottom of the trough and thus preventing the possibility of its again reaching the surface of the water, I provide a substantially horizontal baffle plate 17, which as here shown is attached to the inlet pipe and surrounds the same, the baffle plate being located below the inlet 14 and above the bottom of the trough and forming the top of a settling chamber 18, the bottom of which is formed by the bottom of the trough. The baffle plate is separated from the curb of the trough by a passage 19 which permits the descent of the relatively heavy foreign matter into the settling chamber where it remains unaffected by movement of water in the upper portion of the trough.

The bottom of the trough is provided with an outlet 20 having a removable closure which may be a valve or a removable plug or stopper. When it is desired to clean out the settling chamber the outlet 20 is opened, thus permitting the contents of the trough, including the settling chamber, to escape. The cleaning of the settling chamber may be facilitated by flushing it with a stream of water after the body of water has escaped from the trough. To this end the inlet 14 is provided with an external screw thread 21, constituting a coupling member, adapted to engage a complemental coupling member on the end of a flexible hose adapted to direct a stream of water against any part of the inner surface of the trough.

As above stated, a stream of water delivered by the inlet 14 flowing upwardly through the surface of the body of water in the trough, raises the central portion of said surface, and causes an effective outward flow of water on the surface. To increase the elevation of the central portion of the surface, I provide a substantially vertical conduit 22, which surrounds the inlet 14, the lower end of the conduit being below the inlet 14 and the upper end above said inlet and below the upper end of the outlets 15. The conduit 22 is preferably of tapering form, its diameter decreasing toward its upper end, and its lower end being raised above the baffle plate 17. The inlet 14 and conduit 22 constitute an injector whereby the elevation of the inner portion of the surface of the body of water is materially increased, the jet of water discharged by the inlet 14 inducing an upward flow of a portion of the body of water, the induced current of water augmenting the direct stream delivered by the inlet 14, and the augmented stream rising above the general level of the water surface. The outward flow of water across the surface is thus rendered more effective than would be the case if the inlet 14 alone were relied on to raise the inner portion of the surface.

The outlets 15 and 20 may be connected in any suitable way with a drain or sewer. The conduit 22 is preferably supported by the baffle plate 17, the baffle plate and conduit 22 being preferably removable to permit access to the bottom of the trough.

It will now be understood that the construction is such that there is always a continuous rapid lateral surface movement of the water in the trough, or, in other words, that the extreme upper stratum is constantly moving aside with sufficient rapidity to carry off to the overflow all, or nearly all, of the objectionable matter, before it can have an opportunity to sink deep enough so as to be retained and contaminate the contents of the trough. Such an action could not result, if the lateral movement were intermittent, or if the supply of water were to come from above in the form of either a shower or a stream, because a shower will result in immediately depressing surface matter, while a falling stream produces eddies. Owing to the fact that the inlet is at a lower level than the outlets, the surface water will continuously flow horizontally from a point substantially above the inlet so that an animal can drink anywhere, either from directly above the inlet, or at any portion laterally therefrom, within the limits prescribed by the guard 16. And since the guard overhangs all portions of the surface which are at the greatest distance from the inlet, an animal can not drink anything which may be momentarily on the surface before escaping through an outlet, it being understood, of course, that the places where there might be objectionable floating particles, would be where the water strikes the upright wall of the trough, and has to be deflected toward an outlet.

I claim:

1. A watering trough provided with a supply pipe having an inlet nozzle, a plurality of outlets arranged adjacent the outer portion of said trough and surrounding said nozzle, the entrances to said outlets being above the plane of said nozzle, whereby the latter is constantly submerged, a central baffle plate below said nozzle, and means coacting with the nozzle for raising the surface of the water immediately above said nozzle and causing a downward current adjacent the outer portion of the trough.

2. A watering trough provided with a supply pipe having an inlet nozzle, a plurality of outlets arranged adjacent the outer portion of said trough and surrounding said nozzle, the entrances to said outlets being above the plane of said nozzle, whereby the latter is constantly submerged, a central baffle plate located below said nozzle, and means above the baffle plate and surrounding the nozzle for raising the surface of the water immediately above said nozzle.

3. A watering trough provided with a supply pipe having an inlet nozzle, a plurality of outlets arranged adjacent the outer portion of said trough and surrounding said nozzle, the entrances to said outlets being above the plane of said nozzle, whereby the latter is constantly submerged, a central baffle plate below said nozzle, and a conduit carried by said baffle plate and surrounding said nozzle to raise the surface of the water immediately above said nozzle.

4. A watering trough having an inlet, a plurality of outlets surrounding the inlet at a higher level than said inlet whereby the surface water will continuously flow in all directions horizontally from a point above the inlet, and a guard for the portions of the surface which are at the greatest distance from the inlet.

5. A watering trough having a curved rim provided with an inwardly projecting guard, an inlet at substantially the center of the trough, and outlets underneath said guard, the inlet being below the level of the outlets whereby the surface water will continuously flow laterally from a point above the inlet to the outlets under the guard.

In testimony whereof I have affixed my signature, in presence of two witnesses.

WILLIAM D. QUIMBY.

Witnesses:
CHARLES F. BROWN,
P. W. PEZZETTI.

---

Copies of this patent may be obtained for five cents each, by addressing the "Commissioner of Patents, Washington, D. C."